United States Patent [19]
Chang et al.

[11] 3,843,790
[45] Oct. 22, 1974

[54] DIBENZODEPIN THERAPEUTIC AGENT
[75] Inventors: Yi-Han Chang, Waterford; William M. McLamore, Gales Ferry; James R. Tretter, East Lyme, all of Conn.
[73] Assignee: Pfizer Inc., New York, N.Y.
[22] Filed: May 8, 1972
[21] Appl. No.: 251,523

Related U.S. Application Data
[62] Division of Ser. No. 40,420, May 25, 1970.

[52] U.S. Cl. .............................................. 424/250
[51] Int. Cl. .......................................... A61k 27/00
[58] Field of Search .............. 424/250; 260/240 TC

[56] References Cited
UNITED STATES PATENTS
3,514,449  5/1970  Tretter.......................... 260/240 TC Primary Examiner—Jerome D. Goldberg
Attorney, Agent, or Firm—Connolly and Hutz

[57] ABSTRACT

*Trans*-2-chloro-11-(3-piperazinylpropylidene)-6H-dibenz[b,e]oxepin dihydrochloride has been isolated in pure crystalline form from the corresponding isomeric *cis-trans* mixture obtained via organic synthesis. The pure *trans*- isomer is useful as a non-steroidal anti-inflammatory agent.

9 Claims, No Drawings

DIBENZODEPIN THERAPEUTIC AGENT

CROSS REFERENCE TO RELATED APPLICATION

This application is a division of application Ser. No. 40,420 filed May 25, 1970.

BACKGROUND OF THE INVENTION

This invention relates to a new and useful dibenzoxepin therapeutic agent. More particularly, it is concerned with a novel method of therapy for combatting inflammatory conditions by the use of this compound in the form of one of its isomers.

In the past, it was known that 2-chloro-11-(3-piperazinylpropylidene)-6H-dibenz[b,e]oxepin dihydrochloride could be obtained in the form of a cis-trans mixture when synthesized from 2-chlorodibenz[b,e]oxepin-11(6H)-one and triphenyl[3-(1-piperazinyl)propyl]phosphonium bromide hydrobromide, via a modified Wittig reaction, according to the procedure described by J. R. Tretter in U.S. Pat. No. 3,354,155. This product has some weak psychotropic properties and is useful as a chemical intermediate in the production of still other psychotherapeutic agents. In U.S. Patent Application Ser. No. 609,345, filed Jan. 16, 1967 and now U.S. Pat. No. 3,514,449, there is described a method for the separation of the pure cis-isomer from the aforesaid admixture with the trans compound. The pure cis-isomer is useful as an intermediate leading to the production of the corresponding pure cis-N-(β-hydroxyethyl) derivative, which is known to be active as a tranquilizer (e.g., see British Pat. No. 1,085,405). However, the cis-isomer so isolated in the present connection does not have any significant pharmacological properties per se.

SUMMARY OF THE INVENTION

In accordance with the present invention, it has now been very surprisingly found that the pure trans-isomer of 2-chloro-11-(b 3-piperazinyl-propylidene)-6H-dibenz[b,e]oxepin and the pharmaceutically acceptable acid addition salts thereof constitute a rather unique class of useful therapeutic agent when employed in the field of human and animal drug therapy for the alleviation of inflammatory conditions. Hence, it differs radically from other existing known drugs in this area (i.e., non-steroidal anti-inflammatory agents) not only due to its chemical structure, but also as a result of its unique pharmacological profile. Accordingly, the pure trans-isomer of 2-chloro-11-(3-piperazinylpropylidene)-6H-dibenz[b,e]oxepin finds utility as a novel non-steroidal anti-inflammatory agent and as an immunosuppressive agent for modifying body immune response in warm-blooded animals, including man.

DETAILED DESCRIPTION OF THE INVENTION

In accordance with the process employed for isolating the pure trans-isomer of this invention, a cis-trans isomeric mixture of 2-chloro-11-(3-piperazinylpropylidene)-6H-dibenz[b,e]oxepin, preferably obtained in the form of an acid addition salt via the modified Wittig reaction of J. R. Tretter as described in U.S. Pat. No. 3,354,155, is initially subjected to the separation procedure subsequently reported by the same inventor in co-pending U.S. patent application Ser. No. 609,345, filed Jan. 16, 1967, for the isolation of the corresponding cis-isomer. The aqueous filtrate thus afforded after removal of the cis-isomer is thereafter stirred at lower temperatures (ca. 0°–15°C.) to yield a second crystalline crop of mixed isomer that is predominantly trans (i.e., >50 percent trans). Further recrystallization of this crop from 3M aqueous ammonium chloride, followed by a reslurry in boiling alcohol then gave the pure trans-isomer of 2-chloro-11-(3-piperazinylpropylidene)-6H-dibenz[b,e]oxepin in the form of a crystalline acid addition salt corresponding to the acid addition salt of the starting material, at least insofar as chemical analyses are concerned.

As previously indicated, the trans-isomer of this invention, either in the form of the free base or as a pharmaceutically acceptable acid addition salt, such as the dihydrochloride, is readily adapted to therapeutic use as an anti-inflammatory agent and as an immunosuppressive. For instance, trans-2-chloro-11-(3-piperazinylpropylidene)-6H-dibenz[b,e]oxepin, as the crystalline dihydrochloride acid addition salt (m.p. 249°–251°C.), has been found to suppress the polymorphonuclear (PMN) phagocytosis of starch granules in vitro at concentrations as low as $1 \times 10^{-5}$M and is, therefore, approximately 10 times more active than either indomethacin or phenylbutazone in this respect, albeit the latter two compounds are both well known to those skilled in the art as standard (i.e., commercial) non-steroidal anti-inflammatory agents. Additionally, in urate crystal-induced synovitis, which resembles human gouty arthritis in many respects, trans-2-chloro-11-(3-piperazinylpropylidene)-6H-dibenz[b,e]oxepin dihydrochloride has been found to definitely suppress the synovial fluid pressure response to the urate injection, as well as to reduce the synovial fluid leukocyte count, when administered intravenously at 5 mg./kg. or intraperitoneally at 10 mg./kg., or even intraarticularly at 2 mg./joint.

In addition, trans-2-chloro-11-(3-piperazinylpropylidene)-6H-dibenz[b,e]-oxepin, as the dihydrochloride, has also been found to have a unique specific effect on lymphoid tissues. For example, when monkeys were given the drug orally at 30 mg./kg. per day for a period of 5–24 days, there was found to be clear evidence of atrophy of the follicles in the spleen and mesenteric lymph nodes. Moreover, these changes are shown to be reversible upon drug withdrawal and to be similar to those described in the past for immunosuppressive agents like hydrocortisone or 6-mercaptopurine. However, the trans-isomer of the present invention differs strikingly from the latter type prior art compounds in that it does not cause changes in the bone marrow or differential blood cell count in any of the animals so investigated.

In accordance with a method of treatment of the present invention, the herein described novel dibenzoxepin therapeutic agent can be administered to a host subject via either the oral or parenteral routes of administration. In general, the trans-isomer of 2-chloro-11-(3-piperazinylpropylidene)-6H-dibenz-[b,e]oxepin is most desirably administered in doses ranging from about 20 mg. up to about 1.0 g. per day, although variations will still necessarily occur depending upon the weight of the subject being treated. However, a dosage level that is in the range of from about 0.3 mg. to about 15 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid overall range may be more than adequate, while in other cases still slightly larger does may have to be employed but this can be safely done without causing any substantially harmful or deleterious side effects to occur in the subject to whom they are so administered.

In connection with the use of the *trans*-isomer of this invention for the treatment of a host subject, it is to be noted that it may be administered either alone or in combination with pharmaceutically acceptable carriers by either of the routes previously indicated, and that such administration can be carried out in both single and multiple dosages. More particularly, the novel therapeutic agent of the invention can be administered in a wide variety of different dosage forms, i.e., it may be combined with various pharmaceutically-acceptable inert carriers in the form of tablets, capsules, lozenges, troches, hard candies, powders, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective agent of this invention is present in such dosage forms at concentration levels ranging from about 0.5 percent to about 90 percent by weight of the total composition, i.e., in amounts which are sufficient to provide the desired unit dosage.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in the connection would also include lactose or milk sugar, as well as high molecular weight polyethylene glycols. When aqueous suspensions and/or elixirs are desired for oral administration, the essential active ingredient therein may be combined with various sweetening or flavoring agents, coloring matter or dyes, and, if so desired, emulsifying and/or suspending agents as well, together with such diluents as water, ethanol, propylene glycol, glycerin and various like combinations thereof.

For purposes of parenteral administration, solutions of the *trans*-isomer of this invention in either sesame or peanut oil or in aqueous propylene glycol may be employed, as well as sterile aqueous solutions of the corresponding water-soluble, pharmaceutically acceptable acid addition salts. Such aqueous solutions should be suitably buffered if necessary and the liquid diluent first rendered isotonic with sufficient saline or glucose. These particular solutions are especially suitable for intravenous, intramuscular and subcutaneous injection purposes.

EXAMPLE I

A 25.4 kg. lot of mixed isomers of 2-chloro-11-(3-piperazinylpropylidene)-6H-dibenz[b,e]oxepin dihydrochloride (60:40 *cis-trans* mixture obtained by the detailed procedure described in U.S. Patent Application Ser. No. 609,345, filed Jan. 16, 1967) was dissolved in 61.2 gal. of warm water containing 37.2 kg. of ammonium chloride at 58°C. (this represented a 3M aqueous $NH_4Cl$ solution). The resulting solution was then stirred for 30 minutes at the aforesaid temperature and thereafter slowly allowed to cool to 40°C. during the course of a 6-hour period, with infrequent agitation being permitted throughout the cooling step (i.e., stirring at 30-minute intervals). The crystalline material that separated at this point (essentially pure *cis*-isomer) was then removed by means of suction filtration, and the aqueous filtrate thus obtained saved and subsequently returned to a 100-gal. vessel for use in the next step of the procedure.

The aqueous filtrate was next stirred at 5°–10°C. overnight (approximately 16 hours), and the crystalline material that separated at this point was collected by means of suction filtration and washed with 7 gal. of acetone. Air-drying to constant weight then gave 12.3 kg. of crystalline product that assayed to be about 60 percent *trans*-isomer (m.p. 210°–233°C.), based on thin layer chromatography analysis using ethyl acetate/diethylamine/water (90:15:5 by volume) as solvent for the system.

A 7.5 kg. portion of the above crystalline crop of mixed isomers (60 percent *trans*) was then recrystallized four times from 3M aqueous ammonium chloride solution and thereafter reslurried in ca. 10 gal. of boiling ethanol for a period of 6 hours. The resultant crystalline slurry was then cooled to 25°C. and stored under these conditions for a further period of 24 hours without any additional agitation. Subsequent collection of this second crop of crystals by means of suction filtration, followed by washing with separate portions of cold ethanol and acetone then gave 100 percent pure *trans*-isomer as the final product. On air-drying the latter material to constant weight, there were ultimately obtained 2.35 kg. (14.3 percent) of pure *trans*-2-chloro-11-(3-piperazinylpropylidene)-6H-dibenz[b,e]oxepin dihydrochloride, m.p. 249-251°C.

EXAMPLE II

Rabbit peritoneal leukocytes were obtained by a modification of the method of Z. A. Cohn et al., as described in the Journal of Experimental Medicine, Vol. 110, pp. 419–443 (1959), using rabbits of the New Zealand strain. Two days following the priming doses (50 ml. of 0.1 percent glycogen intraperitoneally, on a daily basis, for a period of four days), a further dose of 250 ml. was injected. 4 hours later, Hank's solution (100 ml. containing 5 mg. of heparin) was injected using a perforated No. 15 needle. Leaving the needle in place, the abdomen was massaged gently and then allowed to drain gently, via gravity, into an ice-cooled container. The leukocytes were then sedimented by means of centrifugation at 1,000 r.p.m. (4°C.), and the resulting pellet resuspended in Krebs-Ringer phosphate buffer (containing a one-half normal amount of calcium chloride) at pH 7.4 to give a concentration of 5 × 10⁷ cells/ml.

The effect of the drug on phagocytosis was determined by the albumin-I$^{131}$ method of Y. H. Chang, as reported in Experimental Cell Research, Vol. 54, p. 42 (1969). The rabbit serum (1.01 ml.) at pH 7.4 and 1.0 ml. of polymorphonuclear (PMN) leukocytes suspension (5 × 10⁷ cells/ml.) in Krebs-Ringer phosphate buffer were pipetted into a 25 ml. serum vial, followed by 0.2 ml. of the drug solution [either *trans*-2-chloro-11-(3-piperazinylpropylidene)-6H-dibenz[b,e]oxepin dihydrochloride (CP-17,299), phenylbutazone or indomethacin] or 0.2 ml. of double-distilled water in the case of a blank. The vial was then placed in a Dubnoff-Metabolic shaking incubator pre-set at 37°C. and 80 reciprocations per minute. After 30 minutes of incubation under these conditions, 0.4 ml. of a starch suspension (5 mg./ml., containing 6.7 × 10⁸ granules of starch per each mg.) in a Krebs-Ringer phosphate buffer, containing labelled human serum albumin at 10.0 μc/ml. and glucose at 7.5 mg./ml., was quickly added to the vial. An identical solution lacking the starch was added to another vial which served as the control. Incubation was then allowed to continue for an additional 30 minutes and was thereafter terminated by placing the serum vial in ice.

After working-up the contents of the serum vial according to the procedure of Chang, the resulting solution was then assayed for radioactivity using standard liquid scintillation counting techniques for said detection. The results obtained in this manner, with respect to the present inhibition of phagocytosis, are summarized below in the following table:

| Compound | Concentration | %Inhibition |
| --- | --- | --- |
| CP-17,299 | 1 × 10⁻⁵M | 27 |
| CP-17,299 | 1 × 10⁻⁵M | 15 |
| CP-17,299 | 1 × 10⁻⁵M | 27 |
| CP-17,299 | 1 × 10⁻⁵M | 16 |
| Phenylbutazone | 1 × 10⁻⁵M | 3 |
| Phenylbutazone | 5 × 10⁻⁵M | 7 |
| Phenylbutazone | 1 × 10⁻⁵M | 18 |
| Phenylbutazone | 1 × 10⁻⁴M | 21 |
| Phenylbutazone | 1 × 10⁻⁴M | 24 |
| Phenylbutazone | 1 × 10⁻⁴M | 21 |
| Indomethacin | 1 × 10⁻⁵M | 6 |
| Indomethacin | 1 × 10⁻⁴M | 23 |

From the data presented in this table, it is obvious that *trans*-2-chloro-11-(3-piperazinylpropylidene)-6H-dibenz[b,e]oxepin dihydrochloride (CP-17,299) has a significant effect in suppressing the polymorphonuclear (PMN) phagocytosis of starch granules, caused by leukocytes, when tested in vitro at a concentration level as low as 1 × 10⁻⁵M. The suppressive activity of this isomer was found to be approximately equivalent to that of phenylbutazone or indomethacin when the latter were tested at concentration levels ten times as high (i.e., at 1 × 10⁻⁴M, respectively).

EXAMPLE III

The intrasynovial injection of sodium urate crystals into the knee-joint of anesthetized dogs was carried out according to the procedure of D. J. McCarthy et al., as described in the Journal of Experimental Medicine, Vol. 124, pp. 99–114 (1966), using mongrel dogs of both sexes as the as the test animals. This resulted in an increase in intrasynovial pressure and cell count, as well as in a decrease in pH (and therefore, resembles human gouty arthritis in many respects), as compared to the results obtained when saline was injected into the opposite knee in accordance with this very same procedure. In the test run, *trans*-2-chloro-11-(3-piperazinylpropylidene)-6H-dibenz[b,e]oxepin dihydrochloride was administered either intravenously or intraperitoneally 30 minutes prior to the urate injection, and the synovial fluid measurements were taken 5 hours later. The animals were used only once during the course of the test run.

It was found that when *trans*-2-chloro-11-(3-piperazinylpropylidene)-6H-dibenz[b,e]oxepin dihydrochloride was administered intravenously at 5 mg./kg. and at 10 mg./kg., respectively, crystal-induced synovitis in the dog was definitely suppressed. When the compound was administered intraarticularly at 2 mg./joint, it was also found to suppress or cause reductions in the urate-induced synovial fluid pressure response and synovial fluid leukocyte count. *Trans*-2-chloro-11-(3-piperazinylpropylidene)-6H-dibenz[b,e]-oxepin dihydrochloride also suppressed crystal-induced synovitis (i.e., synovial fluid pressure rise) when administered intraperitoneally at 10 mg./kg., but it did not reduce the concentration of leukocytes in the synovial exudate under these conditions.

EXAMPLE IV

The effect of a drug on the Reverse-Passive Arthus Reaction (RPA) was determined as hereinafter described, using normal rats of the Charles River strain. The rats, each weighing 200–220 g., were injected intravenously with 1.0 ml. of physiological saline solution containing 2.5 mg. of Evan's blue, 5.0 mg. of egg albumen and 2.0 × 10⁶ CPM of radio-iodinated (I$^{131}$) human serum albumin (65–90 μc/mg.), followed immediately by intracutaneous injections of 0.03 ml. of rabbit anti-egg albumin antiserum, diluted to contain 3.65 mg. of antibody/mg., at two sites on the back. The animals were then sacrificed at three hours post injection and the skin was removed by means of peeling. The intracutaneous injection sites, shown by blue color, were then punched out using a ¾-inch gasket punch. A piece of skin close to the injection site was also punched out to serve as a control. The skin samples were then hydrolyzed in 5 ml. of 10N aqueous sodium hydroxide solution by heating said system on a steam bath for 30 minutes, and the radioactivity of the resulting hydrolysate was determined by gamma counting in a Nuclear-Chicago Automatic Gamma Counting System, Model No. 4230. The drugs were administered intraperitoneally one hour prior to injection of the dye-albumen solution. The results obtained in this manner are summarized below in the following table, where the effect of *trans*-2-chloro-3-(11-piperazinylpropylidene)-6H-dibenz[b,e]oxepin dihydrochloride (CP-17,299), indomethacin and sodium (Na) salicylate on the RPA Reaction are clearly set forth at various dosage levels:

| Compound | Dose (mg./kg.) | %Supp.±S.E. |
| --- | --- | --- |
| CP-17,299 | 33 | 35±8 |
| CP-17,299 | 64 | 64±4 |
| CP-17,299 | 64 | 47±13 |
| CP-17,299 | 100 | 58±14 |

-Continued

| Compound | Dose (mg./kg.) | %Supp.±S.E. |
| --- | --- | --- |
| Indomethacin | 100 | 3±12 |
| Indomethacin | 200 | 63±3 |
| Indomethacin | 200 | 18±7 |
| Na Salicylate | 400 | 36±6 |

From the data presented in this table, it is clearly seen that trans-2-chloro-11-(3-piperazinylpropylidene)-6H-dibenz[b,e]oxepin dihydrochloride (CP-17,299) very definitely causes a reduction in the Arthus reaction to a rather high degree when administered intraperitoneally at 33 mg./kg., 64 mg./kg. and 100 mg./kg., respectively. It is, therefore, far more active than either indomethacin or sodium salicyalte (both known anti-inflammatory agents used to treat rheumatoid arthritis), which are only effective at very high dose levels (viz., at 200 mg./kg. and 400 mg./kg., respectively) when employed under these very same conditions.

EXAMPLE V

The effects of trans-2-chloro-11-(3-piperazinylpropylidene)-6H-dibenz[b,e]oxepin dihydrochloride on lymphoid tissues were studied in mongrel dogs at 12.5 mg./kg., 25 mg./kg. and 50 mg./kg., respectively, and in Rhesus monkeys at 3 mg./kg., 10 mg./kg. and 30 mg./kg., respectively, in both instances by the oral route of administration. The mesenteric lymph nodes were biopsied and examined histologically, while serum electrophoresis and hematology (i.e., differential count, sedimentation rate and eosinophil count) were carried out on a weekly basis. On completion of these steps, the tonsil, the peripheral-lymph nodes, thymus, spleen, Peyer's patches of the intestine, and the bone marrow were also examined histologically.

In the dog, it was found on histological examination that pre-dosing mesenteric lymph node biopsies made prior to dosing were not abnormal, but that after seven-days of dosing, biopsied lymph nodes (i.e., after treatment with trans-2-chloro-11-(3-piperazinylpropylidene)-6H-1-dibenz[b,e]oxepin dihydrochloride) were observed to contain follicles with ill-defined coronas and germinal centers composed of primitive reticular cells (histiocytes) which had a cytoplasmic vacuolization that was carbohydrate, protein and lipid negative. After 14 days of dosing, the lymph node follicles had an increased quantity of vacuolated cells in their germinal centers with a loss, i.e., a conspicuous absence, of their respective coronas. Lymph nodes biopsied after 21 days of dosing also exhibited pronounced histological changes consisting specifically of distinct clusters of excessively vacuolated histiocytes throughout the cortex, together with the absence of any discernible cortical follicles with their respective coronas plus the presence of several vacuolated histiocytes occupying the medullary sinuses. Those nodes examined 28 days after oral dosing only differed quantitatively from those examined at the 21-day mark. However, when the drug was withdrawn for a two-week period, significant changes were again observed to occur in the follicles, i.e., the vacuolated cells observed in the germinal centers during the dosing stage were now decreased in number and the usual large blast cells that occupy the normal germinal center were again observed to be present. Throughout this entire investigation, the differential blood cell counts in all the animals examined were always found to be normal.

In monkeys that received trans-2-chloro-11-(3-piperazinylpropylidene)-6H-dibenz[b,e]oxepin dihydrochloride orally (in capsule form) at 30 mg./kg. per day for a period of 5–24 days, significant histological changes were observed in the spleen and in the mesenteric lymph nodes of said animals. These particular follicular changes consisted of a reduction in the size of the follicles, as well as an apparent loss of the germinal center cells and a reduction in size and cellularity of the coronas. In addition, 25 percent of the animals had similar splenic and mesenteric lymph nodal follicular changes when administered the drug at 10 mg./kg. per day, via the oral routes of administration, for a period of 34 days.

In both cases, these changes in the lymphoid tissue after oral administration of trans-2-chloro-11-(3-piperazinylpropylidene)-6H-dibenz[b,e]-oxepin dihydrochloride were found to be similar to those described for immunosuppressive agents like hydrocortisone or 6-mercaptopurine. However, the present trans-isomer of this invention was found to cause no changes in the bone marrow or differential blood cell count in any of the animals that had been so treated and therefore, differs strikingly from the prior art immunosuppressive agents in this very important aspect.

EXAMPLE VI

A dry solid pharmaceutical composition is prepared by combining the following materials together in the proportions by weight indicated below:

| | |
| --- | --- |
| Trans-2-chloro-11-(3-piperazinylpropylidene)-6H-dibenz[b,e]oxepin dihydrochloride | 50 |
| Sodium citrate | 25 |
| Alginic acid | 10 |
| Polyvinylpyrrolidone | 10 |
| Magnesium stearate | 5 |

After the dried mixture is thoroughly blended, tablets are punched from the resulting mixture, each tablet being of such size that it contains 50 mg. of the active ingredient. Other tablets are also prepared in a similar manner containing 5, 10 and 25 mg. of the active ingredient, respectively, by merely using the appropriate amount of the trans-isomer compound in each case.

EXAMPLE VII

A dry solid pharmaceutical composition is prepared by combining the following materials together in the proportions by weight indicated below:

| | |
| --- | --- |
| Trans-2-chloro-11-(3-piperazinylpropylidene)-6H-dibenz[b,e]oxepin dihydrochloride | 50 |
| Calcium carbonate | 20 |
| Polyethylene glycol, average molecular weight 4000 | 30 |

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient quantity of material in each instance so as to provide each capsule with 100 mg. of the active ingredient.

EXAMPLE VIII

An aqueous propylene glycol solution containing trans-2-chloro-11-(3-piperazinylpropylidene)-6H-dibenz[b,e]oxepin dihydrochloride is prepared by dissolving the latter compound in propylene glycol-water (1:3 by weight) with the aid of gentle heating. The amount of compound employed is such that the resulting solution contains 5 mg. of the active ingredient per ml. of solution. After cooling to room temperature, it is sterilized by means of filtration through a Seitz filter. The sterile aqueous propylene glycol solution so obtained is then suitable for intramuscular administration to animals.

What is claimed:

1. A method for alleviating inflammatory conditions in a warm-blodded animal, which comprises internally administering to an animal in need of treatment an anti-inflammatory amount of a compound selected from the group consisting of *trans*-2-chloro-11-(3-piperazinylpropylidene)-6H-dibenz[b,e]oxepin and the pharmaceutically acceptable acid addition salts thereof.

2. A method as claimed in claim 1 wherein the compound is administered parenterally.

3. A method as claimed in claim 1 wherein the compound is administered orally.

4. A method as claimed in claim 1 wherein the compound is administered in conjunction with a pharmaceutically acceptable carrier.

5. A method as claimed in claim 1 wherein the compound is administered at a dosage level that is in the range of from about 0.3 mg. to about 15 mg. per kg. of body weight per day.

6. A method as claimed in claim 1 wherein the compound administered is *trans*-2-chloro-11-(3-piperazinylpropylidene)-6H-dibenz[b,e]oxepin dihydrochloride.

7. A method for combatting inflammatory conditions in a warm-blooded animal, which comprises parenterally administering to an animal in need of treatment a compound selected from the group consisting of *trans*-2-chloro-11-(3-piperazinylpropylidene)-6H-dibenz[b,e]oxepin and the pharmaceutically acceptable acid addition salts thereof at a dosage level that is in the range of from about 0.3 mg. to about 15 mg. per kg. of body weight per day.

8. An orally administrable pharmaceutical composition comprising a minor, but anti-inflammatorily-effective amount of a compound selected from the group consisting of *trans*-2-chloro-11-(3-piperazinylpropylidene)-6H-dibenz[b,e]oxepin and the pharmaceutically acceptable acid addition salts thereof and a major amount of a solid pharmaceutically-acceptable carrier.

9. A parenterally administrable pharmaceutical composition comprising a minor, but anti-inflammatorily-effective amount of a compound selected from the group consisting of *trans*-2-chloro-11-(3-piperazinylpropylidene)-6H-dibenz-[b,e]oxepin and the pharmaceutically acceptable acid addition salts thereof and a major amount of a sterile parenteral diluent.

* * * * *